United States Patent

Raulie

(10) Patent No.: US 7,927,695 B2
(45) Date of Patent: Apr. 19, 2011

(54) COMPOSITE ROOFING AND METHODS OF PRODUCING COMPOSITE ROOFING

(75) Inventor: Ralph E. Raulie, Akron, OH (US)

(73) Assignee: ExxonMobil Chemical Patents Inc., Houston, TX (US)

(*) Notice: Subject to any disclaimer, the term of this patent is extended or adjusted under 35 U.S.C. 154(b) by 496 days.

(21) Appl. No.: 11/443,695

(22) Filed: May 31, 2006

(65) Prior Publication Data

US 2007/0277450 A1 Dec. 6, 2007

(51) Int. Cl.
*B32B 27/08* (2006.01)
*E04B 7/02* (2006.01)
*B29C 65/02* (2006.01)

(52) U.S. Cl. ............... 428/319.3; 428/319.7; 428/319.9; 52/90.1; 52/309.4; 52/309.8; 52/309.9; 264/241; 264/319

(58) Field of Classification Search ............... 428/319.3, 428/319.7; 52/90.1, 309.7
See application file for complete search history.

(56) References Cited

U.S. PATENT DOCUMENTS

| | | | |
|---|---|---|---|
| 3,037,954 A | 6/1962 | Gessler et al. | |
| 3,801,531 A | 4/1974 | Berejka et al. | |
| 3,867,247 A | 2/1975 | O'Farrell et al. | |
| 4,311,628 A * | 1/1982 | Abdou-Sabet et al. | 524/447 |
| 4,537,825 A * | 8/1985 | Yardley | 428/327 |
| 4,997,707 A * | 3/1991 | Otawa et al. | 428/319.3 |
| 6,245,856 B1 * | 6/2001 | Kaufman et al. | 525/240 |
| 6,284,833 B1 * | 9/2001 | Ford et al. | 524/515 |
| 6,864,195 B2 * | 3/2005 | Peng | 442/41 |
| 2001/0003625 A1 * | 6/2001 | Apgar et al. | 428/519 |
| 2006/0096213 A1 * | 5/2006 | Griffin et al. | 52/409 |
| 2006/0179749 A1 * | 8/2006 | Brandt et al. | 52/309.7 |

FOREIGN PATENT DOCUMENTS

| | | |
|---|---|---|
| EP | 0 100 231 A2 | 2/1984 |
| GB | 1 187 772 A | 4/1970 |
| GB | 2 094 226 A | 9/1982 |
| WO | WO 02/051928 | 7/2002 |

* cited by examiner

*Primary Examiner* — Hai Vo
(74) *Attorney, Agent, or Firm* — Kevin M. Faulkner

(57) ABSTRACT

Roofing composites and methods of producing the roofing composites are disclosed. The roofing composites are multi-layer structures in which two layers of the composite structures are bonded to each other by a thermoplastic elastomer composition. The layers are bonded to each other by heat fusing the elastomer composition in one embodiment. The composite structures have a variety of uses, including uses in construction materials such a roofing membranes, interior and exterior siding, and wall coverings.

14 Claims, 1 Drawing Sheet

COMPOSITE ROOFING AND METHODS OF PRODUCING COMPOSITE ROOFING

FIELD OF THE DISCLOSURE

This disclosure relates to composite structures and methods of producing composite roofing having at least two layers bonded to each other. The composite roofing is suitable for a variety of uses, including uses in construction materials associated with insulated constructions, such as roofing membrane systems, interior and exterior siding systems and wall covering systems.

BACKGROUND INFORMATION

In the commercial roofing industry, certain roofing systems are categorized as "single ply" membrane roofing systems. These roofing systems consist of roof membranes that are installed as a single layer. Exemplary membranes are made of ethylene propylene diene terpolymer (EDPM), PVC, thermoplastic polyolefin (TPO), chlorosulfonated polyethylene (CSPE), polyisobutylene (PIB), and modified bitumen. The roof membranes are generally installed by one of three methods: ballasted, mechanically attached, or adhered using adhesives. Generally, commercial roof membranes are installed over roof insulation. The insulation is typically a layer of rigid foam or fiberglass insulation material disposed between two facer layers made of, or are composites of, fiberglass, aluminum, wood, cellulose, paper or other building material. Typically, the roof membrane is attached to or disposed against the top facer layer of the insulation.

Single-ply roof membranes are typically manufactured as elongated sheets having typical widths ranging from approximately 1 to 3 meters or greater. The sheets are typically sold, transported, and stored in rolls. The sheets are unrolled at the installation site and cut and fit to the size of the intended application by piecing together multiple pieces of the membrane. During installation, the edges of adjacent pieces of the sheets are overlapped and sealed together. The sheets of roof membrane are typically held in place over roof insulation by means of stone ballast, mechanical attachment, or adhered to the roof insulation with an adhesive.

Typical adhesive systems used to seal, or seam, edges together or to seal the roof membrane to insulation (which may include one or more insulation facers) include contact or pressure sensitive adhesive compounds. Examples of such compounds include those formulated with neoprene, butyl or butyl type polymers, and tackifying olefins. Those compounds, however, often provide poor peel strength. Furthermore, they often experience degradation in seam performance at elevated temperatures. Other examples of pressure sensitive adhesive compositions for seaming roofing materials are disclosed in U.S. Pat. Nos. 3,801,531 and 3,867,247. However, these adhesive compositions suffer from poor adhesive properties and may contain organic solvents which may be prohibited by environmental regulations. Such adhesives are expensive and time-consuming to apply and are prone to delamination which may cause leaks or separation of the membrane from the insulation facers.

When an adhesive is used to adhere the roof membrane sheet to the roof insulation facer, the roof membrane is typically laid out and positioned over roof insulation, one-half of the roof membrane sheet is folded back onto itself and adhesive, typically packaged in five gallon pails, is applied to both the backside of the roof membrane and the roof insulation surface with long handled paint rollers. After adhesive set up, i.e., solvent flash off, the folded back membrane is rolled into place and the procedures repeated for the other half of the sheet. This method is somewhat similar to installing wallpaper on a flat surface. Adhesives used are typically solvated, water-based or two-part urethane type products.

When adhering roof membranes to surfaces such as insulation facers, there are a number of shortcomings associated with the use of adhesives, including: the lack of reliable bonds, condensation forming on the adhesive surface which inhibits bonding, environmental concerns associated with flash off of solvent carriers, landfill disposal concerns associated with the large quantities of adhesive buckets, and residual solvent from the contact adhesive becoming trapped between the roof membrane and insulation, causing delamination. These adhesive compositions often suffer from poor adhesive performance properties due to human application error, and may contain organic solvents which may be prohibited by environmental regulations.

In recent years, thermoplastic polyolefin compounds have been used increasingly in roof membrane applications due to factors such as low cost and environmental acceptance. Efforts have been undertaken to secure these thermoplastic olefin compound membranes in place by adhesives to adhere the membranes to insulation facers.

Thermoplastic membranes may include components in the membrane formulations designed to promote adhesion between adjoining membrane sheets. WO 02/051928 discloses a composite polymer structure in which a first polymer is adhered to and is in surface contact with a second polymer structure by adhesive interface between the first polymer structure and the second polymer structure. Interfacial adhesion is provided by a semi-crystalline random copolymer in the first polymer structure, in the second polymer structure, and in a third adhesive layer, if used.

BRIEF DESCRIPTION OF THE DISCLOSURE

One aspect of the invention is directed to a roofing composite comprising a thermoplastic outer layer having a first surface and a second surface; a thermoplastic elastomer layer having a first surface and a second surface, wherein the first surface of the thermoplastic elastomer layer is bonded to the second surface of the thermoplastic outer layer; an insulation facing layer having a first surface and a second surface, wherein the first surface of the insulation facing layer is bonded to the second surface of the thermoplastic elastomer layer; and an insulation layer attached to the second surface of the insulation facing layer by the insulation manufacturers standard process for insulation facing attachment.

Another aspect of the invention is directed to a method of producing a roofing composite comprising positioning a thermoplastic elastomer layer having a first and second surface between a thermoplastic outer layer having a first and second surface and a insulation facing layer having a first and second surface wherein the second surface of the facing layer is bound to an insulation layer; and then bonding the first surface of the thermoplastic elastomer layer to the second surface of the thermoplastic outer layer and the second surface of the thermoplastic elastomer layer to the first surface of the insulation facing layer.

DETAILED DESCRIPTION OF THE DISCLOSURE

Figure 1:
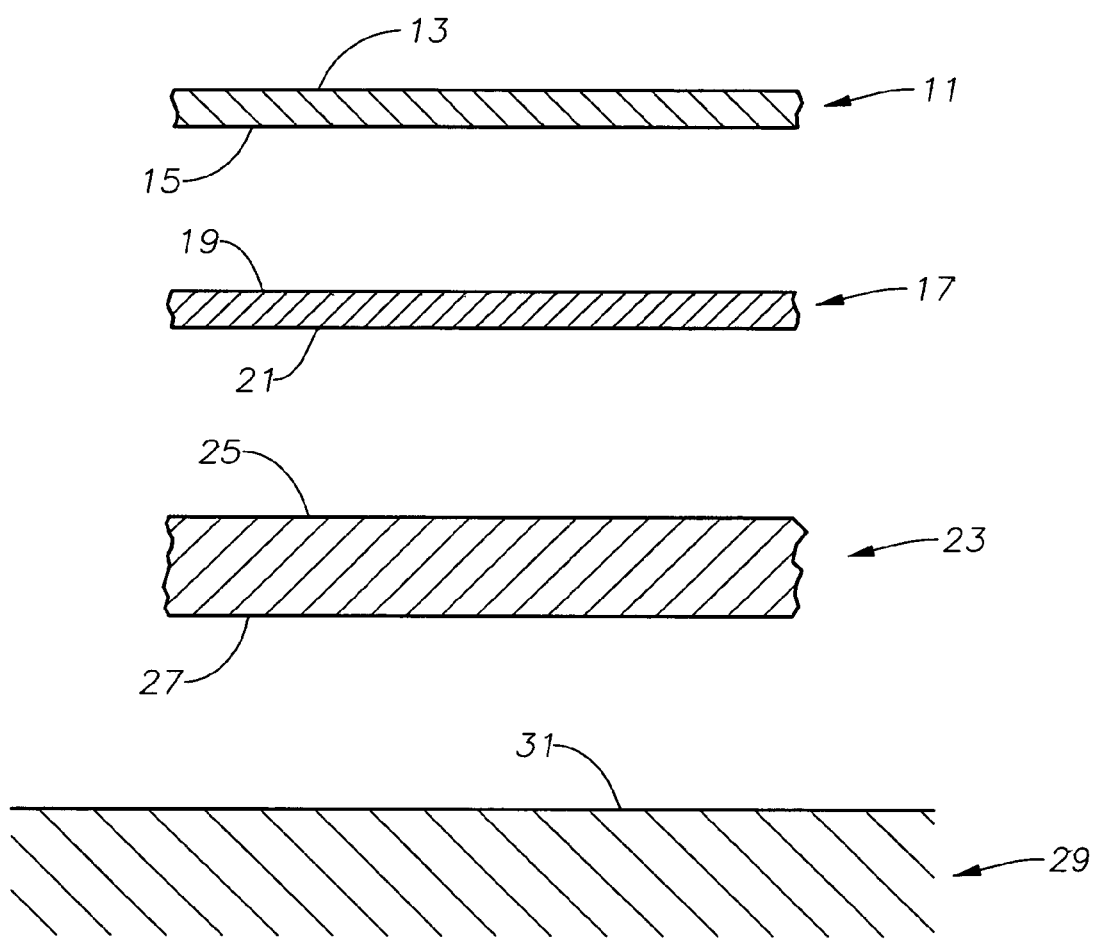
FIG. 1 represents a cross-section of an embodiment of a roofing composite wherein the insulation layer is bound to the thermoplastic outer layer through a thermoplastic elastomer layer, the layers shown separated here for purposes of clarity.

This disclosure relates to roofing composites that are useful in applications including roofing systems and other construction systems such as interior and exterior siding materials, and wall coverings. This disclosure also relates to methods of producing such roofing composites. Generally, the roofing composites comprise a thermoplastic outer layer bound to an insulation layer, optionally having one or more insulation facing layers, through the use of a thermoplastic elastomer composition that forms a thermoplastic elastomer layer as part of the roofing composite. In the embodiments where the insulation includes at least one insulation facing layer, the thermoplastic elastomer layer is bound to the insulation facing layer, which therein also forms a bond to the thermoplastic outer layer to complete the roofing composite.

As used herein, the term "layer" is used to refer to each of the one or more materials, the same or different, that are secured to one another by any appropriate means such as by an inherent tendency of the materials to adhere to one another, or by inducing the materials to adhere as by a heating, radiative, chemical, or some other appropriate process. The term "layer" is not limited to detectable, discrete materials contacting one another in a finished product such that a distinct boundary exists between the materials. The term "layer" includes a finished product having a continuum of materials throughout its thickness.

As used herein, the terms "bonded" and "bond" refers to the state in which two or more materials, the same or different, are secured to one another by any appropriate means such as by an inherent tendency of the materials to adhere to one another, or by inducing the materials to adhere as by a heating (or "heat fusing"), radiative, chemical, or some other appropriate process.

As used herein, the phrase "roofing composite" means any material capable of covering a building in part or in whole, with or without walls, such that moisture and/or water is prevented from penetrating from the one surface to the opposite surface of the material. More particularly, a "roofing composite" as used herein is a sheet of one or more layers of components that is an external covering on the side or upper portion of a building, house, etc. Preferably, the roofing composite is placed on a house or other building such that it covers a supportive wall or roof and prevents moisture and water from penetrating into the house or building.

The "thermoplastic outer layer", which may be in the form of a roof membrane or other construction materials such as siding or wall covering, may be any suitable thermoplastic material. More particularly, the "thermoplastic outer layer" means a layer that has a continuous thermoplastic phase of a composition incorporating a sufficient amount thermoplastic polymer to achieve effective bonding in accordance with the invention that is at least 20 wt % of one or more thermoplastic polymeric components. In a more preferred embodiment, the thermoplastic outer layer comprises at least 50 wt % of the thermoplastic polymeric component, and in yet a more preferably embodiment, the thermoplastic outer layer is a thermoplastic polymeric component.

The "thermoplastic outer layer" may comprise any type of thermoplastic as is known in the art, or blend of thermoplastics, or blend of thermoplastic with a rubber. More particularly, the thermoplastic outer layer may comprise one of four types of compositions: (1) a thermoplastic olefin ("TPO") which is a blend of a thermoplastic resin and uncured, or non-cross-linked, rubber; (2) blends of thermoplastic resins and rubbers in which blends, the rubber phase has been partially or fully cured by a dynamic vulcanization process to form thermoplastic vulcanizates ("TPV's"); (3) unvulcanized block-copolymers or blends thereof, including by example triblock styrene copolymers ("SBC"), for example, SBS, SIS, SEBS, and SEPS and the like; and (4) thermoplastic resins such as crystalline or crystallizable polyolefins (e.g., polypropylene and polyethylene), polyimides, polyesters (nylons), poly(phenylene ether), polycarbonates, styrene-acrylonitrile copolymers, polyethylene terephthalate, polybutylene terephthalate, polystyrene, polystyrene derivatives, polyphenylene oxide, polyoxymethylene, and fluorine-containing thermoplastics, and mixtures thereof.

In a preferred embodiment, the thermoplastic resin is a crystalline or a semi-crystalline polymer resin, particularly a polyolefin resin. In another embodiment, the resin has a crystallinity of at least 25 percent as measured by differential scanning calorimetry. Polymers with a high glass transition temperature are also acceptable as the thermoplastic resin. The melt temperature of these resins should generally be lower than the decomposition temperature of the rubber. As used herein, reference to a thermoplastic resin will include a thermoplastic resin or a mixture of two or more thermoplastic resins.

The thermoplastic resins generally have a melt temperature ($T_m$) that is from 120° C. to 175° C. In one embodiment, the melt temperatures range from 155° C. to 170° C. In still another embodiment, the melt temperature ranges from 160° C. to 170° C. The glass transition temperature ($T_g$) of these resins generally ranges from minus 5° C. to 10° C. In another embodiment, the glass transition temperatures range from minus 3° C. to 5° C. In still another embodiment, the glass transition temperatures range from 0° C. to 2° C. The crystallization temperature ($T_c$) of these resins is generally from 95° C. to 130° C. In another embodiment, the crystallization temperatures range from 100° to 120° C. In still another embodiment, the crystallization temperatures range from 105° C. to 115° C. as measured by DSC and cooled at 10° C./min.

The thermoplastic resins generally have a melt flow rate that is less than 10 dg/min. In one embodiment, the melt flow rate is less than 2 dg/min. In another embodiment, the melt flow is less than 0.8 dg/min. Melt flow rate is a measure of how easily a polymer flows under standard pressure, and is measured by using ASTM D-1238 at 230° C. and 2.16 kg load.

Exemplary thermoplastic resins include crystalline or crystallizable polyolefins, polyimides, polyesters (nylons), poly(phenylene ether), polycarbonates, styrene-acrylonitrile copolymers, polyethylene terephthalate, polybutylene terephthalate, polystyrene, polystyrene derivatives, polyphenylene oxide, polyoxymethylene, and fluorine-containing thermoplastics. In one embodiment, the thermoplastic olefins are crystallizable polyolefins that are formed by polymerizing alpha-olefins such as ethylene, propylene, 1-butene, 1-hexene, 1-octene, 2-methyl-1-propene, 3-methyl-1-pentene, 4-methyl-1-pentene, 5-methyl-1-hexene, and mixtures thereof. Polymers of ethylene and propylene or ethylene or propylene with another alpha-olefin such as 1-butene, 1-hexene, 1-octene, 2-methyl-1-propene, 3-methyl-1-pentene, 4-methyl-1-pentene, 5-methyl-1-hexene or mixtures thereof is also contemplated. These homopolymers, copolymers, and terpolymers may be synthesized by using any polymerization technique known in the art such as, but not limited to, the single-site organometallic catalyzed polymerization such as "Phillips catalyzed reactions," conventional Ziegler-Natta type polymerizations, and metallocene catalysis including, but not limited to, metallocene-alumoxane and metalloceneionic activator catalysis. In one embodiment the thermoplastic resin is high-crystalline isotactic or syndiotactic polypropylene. This polypropylene generally has a density of from 0.85 to 0.91 g/cm$^3$, with the largely isotactic polypropylene having a density of from 0.90 to 0.91 g/cm$^3$. In one embodiment, the polypropylene is high and ultra-high molecular weight polypropylene that has a fractional melt flow rate. These polypropylene resins are characterized by a melt flow rate that is less than or equal to 10 dg/min and more preferably less that or equal to 1.0 dg/min per ASTM D-1238.

Any rubber or mixture thereof that is capable of being crosslinked or cured may be used as the rubber component of the TPE which may comprise the thermoplastic polymeric component of the thermoplastic outer layer. Reference to a rubber may include mixtures of more than one rubber. Some non-limiting examples of these rubbers include elastomeric ethylene alpha olefin polymers wherein the alpha olefins are $C_4$ to $C_{20}$, optionally with a $C_5$ to $C_{15}$ non-conjugated diolefin, butyl rubber, natural rubber, styrene-butadiene copolymer rubber, butadiene rubber, acrylonitrile rubber, halogenated rubber such as brominated and chlorinated isobutylene-isoprene copolymer rubber, butadiene-styrene-vinyl pyridine rubber, urethane rubber, polyisoprene rubber, epichlolorohydrine terpolymer rubber, and polychloroprene. In one embodiment, the rubber is an elastomeric polymer or butyl rubber.

The term "elastomeric polymer" refers to any rubbery polymer polymerized from ethylene, at least one alpha-olefin monomer, and optionally at least one diene monomer. The alpha-olefins may include, but are not limited to, propylene, 1-butene, 1-hexene, 4-methyl-1 pentene, 1-octene, 1-decene, or combinations thereof. In one embodiment, the alpha-olefin is selected from propylene, 1-hexene, 1-octene or combinations thereof. The diene monomers may include, but are not limited to, 5-ethylidene-2-norbornene; 1,4-hexadiene; 5-methylene-2-norbornene; 1,6-octadiene; 5-methyl-1,4-hexadiene; 3,7-dimethyl-1,6-octadiene; 1,3-cyclopentadiene; 1,4-cyclohexadiene; dicyclopentadiene; 5-vinyl-2-norbornene and the like, or a combination thereof. The preferred diene monomers are 5-ethylidene-2-norbornene and 5-vinyl-2-norbornene. In the event that the polymer is prepared from ethylene, alpha-olefin, and diene monomers, the polymer may be referred to as a terpolymer or even a tetrapolymer in the event that multiple alpha-olefins or dienes are used. The preferred elastomeric polymers include terpolymers of ethylene, propylene, and 5-ethylidene-2-norbornene.

Elastomeric polymers are commercially available under the designations VISTALON (ExxonMobil Chemical Co.), KELTAN (DSM Copolymers), NORDEL IP (Dow Chemical Co.), BUNA EP (Bayer AG) and ELASTOFLO (Dow Chemical Co.).

The term "butyl rubber" refers to rubbery amorphous copolymers of isobutylene and isoprene or an amorphous terpolymer of isobutylene, isoprene, and a divinyl aromatic monomer. These copolymers and terpolymers should preferably contain from 0.5 to 10 percent by weight, or more preferably from 1 to 4 percent by weight, isoprene. The term butyl rubber also includes copolymers and terpolymers that are halogenated with from 0.1 to 10 weight percent, or preferably from 0.5 to 3.0 weight percent, chlorine or bromine. This chlorinated copolymer is commonly called chlorinated butyl rubber. Butyl rubber is satisfactory for use in the thermoplastic compositions described herein. In one embodiment, halogen-free butyl rubber containing from 0.6 to 3.0 percent unsaturation may be used. In another embodiment, butyl rubber having a polydispersity of 2.5 may be used. Butyl rubber is commercially available from a number of sources as disclosed in the Rubber World Blue Book. For example, butyl rubber is available under the designation POLYSAR BUTYL (Bayer AG) or the designation EXXON BUTYL (ExxonMobil Chemical Co.).

The elastomer (or rubber) component of the rubber/thermoplastic resin blend may be used uncured to form TPO's or it can be partially or fully vulcanized (crosslinked) to form TPV's. Those of ordinary skill in the art will appreciate the appropriate quantities, types of cure systems and vulcanization conditions required to carry out the vulcanization of the rubber. The elastomer can be vulcanized using varying amounts of curative, varying temperatures and varying time of cure in order to obtain the optimum crosslinking desired. Any known cure system can be used, so long as it is suitable under the vulcanization conditions for the elastomer or combination of elastomers being used and is compatible with the thermoplastic polyolefin component of the TPV. These curatives include sulfur, sulfur donors, metal oxides, phenolic resin systems, maleimides, peroxide-based systems, high energy radiation and the like, both with and without accelerators and co-agents. Another curing system which can be used is the hydrosilylation system which consists of the use of a silicon hydride curative catalyzed with a platinum or rhodium derivative. Phenolic resin curatives are preferred for the preparation of the TPV composition of the invention, and such cure systems are well known in the art and literature of vulcanization of elastomers. Their use in TPV compositions is more fully described in U.S. Pat. No. 4,311,628. Usually 5 to 20 weight parts of the curative or curative system are used per 100 weight parts of the rubber to be cured. The process of dynamically curing the rubber in a polyolefin matrix is well known in the art. U.S. Pat. No. 3,037,954 discloses the technique of dynamic vulcanization wherein a vulcanizable elastomer is dispersed into a resinous thermoplastic polymer and the elastomer is cured in the presence of a curative while continuously mixing and shearing the polymer blend. The resulting TPV is a microgel dispersion of cured elastomer in an uncured matrix of thermoplastic polymer.

In one embodiment, the TPV's are selected from partially or fully cured EPDM-rubber/polypropylene blends. In one embodiment, the TPO's are selected from blends of EPDM-rubber and polypropylene.

As mentioned other suitable TPE's for inclusion in the thermoplastic outer layer are block-copolymer of styrene/conjugated diene/styrene, with the conjugated diene optionally being fully or partially hydrogenated, or mixtures thereof. Generally the block-copolymer may contain 10 to 50 wt %, more preferably 25 to 35 wt % of styrene and 90 to 50 wt %, more preferably 75 to 35 wt % of the conjugated diene, based on said block-copolymer. Most preferably, however, is a block-copolymer which contains 30 wt % of styrene and 70 wt % of the conjugated diene. The conjugated diene is selected from butadiene, isoprene or mixtures thereof. Specific block-copolymers of the styrene/conjugated diene/styrene-type are SBS, SIS, SIBS, SEBS and SEPS block copolymers. These block-copolymers are known in the art and are commercially available. Exemplary styrene/conjugated diene/styrene block-copolymers are styrene-butadiene-isoprene-styrene block-copolymer or its hydrogenated derivative, styrene-ethylene-butene-styrene block-copolymer and blends thereof.

Another exemplary thermoplastic resin suitable for use in the thermoplastic outer layer of the roofing composites are poly vinyl chloride polymers ("PVC"). The term PVC includes polyvinyl chloride copolymers with other monomers such as vinyl acetate, acrylonitrile, various acrylic esters and any of the other well-known comonomers. The comonomers can be mixed and can constitute up to 30% of the PVC polymers.

The thermoplastic outer layer is bonded to the facing layer, if present, or directly to the insulation layer, through the use of a "thermoplastic elastomer layer", this layer comprises at least in part a thermoplastic elastomer composition (TPE). The bonding takes place in one embodiment by applying heat to the thermoplastic elastomer layer sufficient to melt the thermoplastic elastomer composition that forms the thermoplastic elastomer layer to form a heat seal between the thermoplastic outer layer and the and facing layer or insulation layer.

For purposes of this disclosure, "thermoplastic elastomer composition" means any material incorporating at least 40 wt % of one or more of a TPV, as described above, and at least 60 wt % in yet another embodiment, and at least 80 wt % in yet another embodiment; and in a most preferred embodiment, the thermoplastic elastomer layer is a TPV. See the description above for details of TPV's. Specific TPV's suitable in accordance with the invention include those from Advanced Elastomer Systems, L.P. (Akron, Ohio) under the tradenames SANTOPRENE® and VYRAM®. Specific exemplary thermoplastic vulcanizates available from Advanced Elastomer Systems, L.P. are SANTOPRENE 8291-80TB and VYRAM 9101-65.

In one embodiment, the thermoplastic elastomer composition comprises the basic thermoplastic resin and dynamically vulcanized cross-linked rubber, but to which have been added one or more "soft" polymeric components to enhance the melt bonding characteristics, a bonding polymeric additive. Such polymeric components will typically include with the thermoplastic vulcanizate styrene block copolymers (SBC), such as styrene-isoprene-styrene (SIS) block copolymers, styrene-ethylene-butene triblock copolymer (SEBS), styrene-ethylene-propylene triblock copolymer (SEPS), lower melting point polyethylene polymers including the copolymers with $C_3$-$C_8$ alpha-olefins for example LLDPE and VLDPE or ULDPE ("plastomers)" copolymers and uncrosslinked EPR or EPDM, and copolymers of propylene with $C_2$ and/or $C_4$-$C_8$ comonomers. Included are the maleic anhydride grafted homopolymers and copolymers of SBC or the identified polyolefins. These bonding polymeric additive are present in amount of 5 wt % to 45 wt % based upon the total weight of the modified TPV composition.

Commercially available SIS and SBS block copolymers include the VECTOR® grade products available from Dexco Polymers LP of Houston, Tex. Those type products, and hydrogenated SBC copolymers, e.g., SEBS and SEPS are available under the trade name KRATON® from Kraton Polymers, Houston, Tex. Suitable maleic anhydride grafted copolymers include KRATON® FG from Kraton and POLYBOND 3000 from Uniroyal. KRATON® FG is a maleic anhydride/SEBS graft copolymer and POLYBOND 3000 is a maleic anhydride/polypropylene graft copolymer. Other suitable maleic anhydride grafted copolymers include the FUSABOND® polyolefins manufactured by Dupont Chemical Co., and the EXXELOR® grade maleic anhydride grafted polyolefins of ExxonMobil Chemical Co.

The thermoplastic elastomer compositions that make up the thermoplastic elastomer layer may also include one or more plastomers at a concentration from 5 wt % to 45 wt %. Plastomers are ethylene-alpha-olefin copolymers made using metallocene catalysis, commercial examples of which include the EXACT® plastomers of ExxonMobil Chemical Company, typically having a density of from 0.860 to 0.910 g/cm$^3$ and MI (190° C./2.16 kg) of 0.5 to 30 g/10 min. A suitable plastomer is EXACT® 0201, a saturated ethylene octene copolymer having a density of 0.902 g/cm$^3$ and an MI (190° C./2.16 kg) of 1.1 g/10 min. Suitable propylene copolymers include HIFAX CA10A and ADFLEX® 359P (Basell), PL1840CT (Dow), and VISTAMAXX® (ExxonMobil Chemical Co.).

In one embodiment, the thermoplastic elastomer composition is in the form of a layer or coating applied to a first surface of the insulation layer or, when present, the insulation facing layer. For example, an extrusion layer of the thermoplastic elastomer composition may be applied to a first surface of the insulation facing layer. The second surface of the coated facing layer is then bonded to the insulation layer by any suitable conventional means, i.e.; in accordance with insulation manufacturers standard method for applying their insulation facing layer to their insulation. In another embodiment, the thermoplastic elastomer component may be applied as a coating or layer on a second surface, or is the second surface, of the thermoplastic outer layer. As with application to the insulation facing layer, the thermoplastic elastomer layer may be applied to the second surface of the thermoplastic outer layer thorough an extrusion coating process. The thickness of the coating or layer of the thermoplastic elastomer component on either the insulation facing layer or the second surface of the thermoplastic outer layer is from 0.02 mm to 10 mm in one embodiment. In other embodiments, the thickness of the thermoplastic elastomer component coating or layer ranges from 0.2 mm to 5.0 mm and from 1.0 mm to 3.0 mm in a most preferred embodiment.

Alternatively, in another embodiment, the thermoplastic elastomer component may be formed as an independent layer and interposed between the second surface of the thermoplastic outer layer and the first surface of the insulation facing layer. In a different embodiment of this type, the thickness of the thermoplastic elastomer layer is from 0.02 mm to 10 mm, from 0.2 mm to 3.0 mm in another embodiment, and from 1.0 mm to 3.0 mm in a most preferred embodiment.

In still another alternative embodiment, the thermoplastic elastomer component may be blended with the thermoplastic polymeric second surface of the thermoplastic outer layer and dispersed throughout the thermoplastic outer layer. In one embodiment, the amount of thermoplastic elastomer component incorporated into the thermoplastic outer layer is from 30 wt % to 50 wt % of the thermoplastic outer layer. In another embodiment, the amount of thermoplastic elastomer component incorporated into the thermoplastic outer layer is from 10 wt % to 20 wt % of the thermoplastic outer layer.

The "facing layer" is an optional feature, but is preferably present and comprises at least one face of the insulation layer; that is, it is bound to one face of the insulation layer such that it covers it and forms a layer on the insulation layer. The insulation facing layer of the insulation layer described herein may be made from a variety of materials. Exemplary suitable materials include fiberglass, aluminum, wood, other construction materials, cellulose, paper, and mixtures thereof. In one embodiment, the facing layer has a thickness of 0.001 mm to 10 mm. In another embodiment, the facing layer has a thickness of 0.01 mm to 5 mm. In still anther embodiment, the facing layer has a thickness of 0.10 mm to 3 mm.

The insulation facing layer serves as a covering for the insulation layer of the roofing composites described herein. The facing layer may be attached to the insulation layer by a variety of techniques including adhesives, mechanical, and chemical bond attachment methods.

The insulation layer of the roofing composites described herein may be constructed from a variety of materials including fiberglass, rigid polyisocyanurate foam, and extruded polystyrene foam. In one embodiment, the insulation layer is a rigid polyisocyanurate foam layer ranging in thickness from 2 cm to 20 cm, and from 3 to 10 cm in yet another embodiment.

The roofing composites are particularly useful in roofing system applications. In one embodiment, insulation is first attached to a roof, wall or other surface such as by adhesives, nails, screws or other fasteners. Then, the thermoplastic elastomer is applied in one embodiment in the form of a sheet or extrusion coat, or in yet another embodiment may be dispersed within the thermoplastic outer layer. Once the thermoplastic elastomer is applied to either the roofing membrane or the insulation facers, or dispersed within the roof membrane, installation of the roofing membrane proceeds according to the usual method as described above in which the membrane is rolled onto the roofing surface. Thereafter, the composite structure is formed by attaching the roof membrane to the insulation facer by the application, or creation, of heat on the backside surface of the roofing membrane and the thermoplastic elastomer exposed surface on the insulation facer sufficient to melt the thermoplastic roof membrane and thermoplastic elastomer. An exemplary method of heating may be conducted by, first folding back half of the roof membrane sheet, and then starting in the middle of the roofing membrane pointing the nozzle of a hot air tool at the insulation facer surface at the edge of the folded back sheet, and applying heat by waving the hot air tool nozzle back and forth, similar to the way a leaf blower is used, while at the same time other workers are pushing, or rolling the leading edge of the folded back roof membrane into place, followed by other workers with push brooms to ensure the heated surfaces have contacted each other. The heating step preferably occurs from the center of the roof membrane sheet to the edges of the sheet. Also, to avoid heat swell of the roof membrane, it is preferable not to overheat an area, i.e., the hot air tool nozzle should be kept moving.

Thus formed, the roofing composite may in one embodiment have a layered form such as the cross-sectional view in FIG. 1, wherein an insulation layer 23, comprising a first surface 25 and a second surface 27, is attached to roof or wall 29 by any suitable means, and the thermoplastic outer layer 11, having a first surface 13 and a second surface 15, is then bonded to the insulation layer 23 using the thermoplastic elastomer layer 17, the layer having a first surface 19 and a second surface 21 and comprising a thermoplastic elastomer composition applied either as a solid sheet, a liquid or other physical form. In one embodiment, the insulation layer 23 has at least one facing layer bound to surface 25, and the thermoplastic outer layer 11 is bound to the facing layer bound to surface 25 using the thermoplastic elastomer composition that forms the thermoplastic elastomer layer 17.

More particularly, FIG. 1 described an embodiment of the roofing composite comprising a thermoplastic outer layer 11 having a first surface 13 and a second surface 15; a thermoplastic elastomer layer 17 having a first surface 19 and a second surface 21, wherein the first surface 19 of the thermoplastic elastomer layer 17 is bonded to the second surface 15 of the thermoplastic outer layer 11; and an insulation layer 23 having a first surface 25 and a second surface 27, wherein the first surface 25 of the insulation layer 23 is bonded to the second surface 21 of the thermoplastic elastomer layer 17, the second surface 27 of the insulation layer 23 being bound or attached to surface 31 of roof or wall 29.

Preferably, the thermoplastic elastomer layer comprises a thermoplastic elastomer composition having a melting point such that the second surface of the thermoplastic outer layer will bond to the first surface of the thermoplastic elastomer composition layer by the application, or creation, of heat and pressure. In one embodiment, the melting point of the thermoplastic elastomer composition ranges from 175° C. to 230° C., and from 185° C. to 220° C. in another embodiment.

In a preferred embodiment, the thermoplastic outer layer is made from a thermoplastic resin selected from the group consisting of polyethylene, polypropylene, polyimides, polyesters (nylons), poly(phenylene ether), polycarbonates, styrene-acrylonitrile copolymers, polyethylene terephthalate, polybutylene terephthalate, polystyrene, polystyrene derivatives, polyphenylene oxide, polyoxymethylene, fluorine-containing thermoplastics, and mixtures thereof.

In another preferred embodiment, the thermoplastic elastomer layer comprises a TPV composition that comprises the cured reaction product of from 20 to 60 wt % poly(ethylene-co-propylene-co-diene) ("EPDM"), from 20 to 60 wt % polypropylene, and from 20 to 40 wt % mineral or paraffinic oil. The TPE composition may also comprise in another embodiment propylene-ethylene copolymers, wherein the ethylene-derived content ranges from 5 to 20 wt % of the polymer. In yet another embodiment, the TPE composition also comprises an ethylene-butene or ethylene-octene copolymer having a density of from 0.87 to 0.90 g/cm$^3$.

Thus, the use of the thermoplastic elastomer to bond the roof membrane to the insulation facer eliminates the need for liquid adhesives and such associated shortcomings as, worker safety, environmental pollution, and weather sensitive installation.

The following examples are illustrative of embodiments of the roofing composites described herein and methods of making those articles. All parts and percentages are by weight unless otherwise noted.

EXAMPLES

Roofing composites were constructed using a thermoplastic elastomer as follows.

Example 1

1.1—A 1.5 m wide by 0.20 mm thick roll of thermoplastic elastomer film was extruded from pellets of Santoprene 8291-80TB, on a 76 mm extruder operated per processing parameters for thermoplastic vulcanizates known in the art. The extruder was fitted with a 1.5 m wide sheet die to produce the film. Prior to extrusion processing, the Santoprene 8291-80TB material was dried at 70° C. for 4 hours in a dehumidified dryer.

1.2—Insulation panels, of ACFOAMII, comprising 5 cm thick×1.2 m wide×2.4 m long, made of rigid polyisocyanurate foam with laminated insulations facer material on each side were obtained from the manufacturer of the product, Atlas Roofing Corporation. The insulation facer material consisted of a heavy, paper-like, cellulostic and chopped strand fiberglass material, which is common to polyisocyanurate foam insulations used in the commercial roofing industry. The roof insulation panels were identical on both sides; therefore there was no top or bottom.

1.3—The first stage of creating the roofing composite involved creating a laminated composite, by dry heat, to chemically and mechanically bond the thermoplastic elastomer film to one side of the insulation facer of the side of the insulation panels.

1.4—The heated lamination process was completed on a Reliant POWERBOND flat-bed laminator. The principle of flat-bed dry-heat laminating is a combination of heating, pressure and controlled speed at which materials are transported through the laminating machine. This machine is a heat tunnel consisting of an upper and lower conveyor belt, which sandwich and transport the layers of materials to be laminated together. The tunnel opening, or gap between the surfaces of the two conveyor belts, can be adjusted to accommodate varying thicknesses of materials to be laminated together. The process is automated, moving the upper and lower conveyors which transport the materials into the machine, where heat is then applied through a series of parallel, electrically heated elements located behind the conveyor belts. The materials are transferred through the heating section of the machine at an optimum speed for the specific materials to ensure the layers, via a melted or heat-activated medium, laminate together.

1.5—At the end of the heating section the materials pass through nip rollers which run across the full width of the machine. The nip rollers exert pressure to the materials, and melted or heat-activated medium, to expel trapped air and press the materials together to create the lamination bond.

1.6—After the nip roll section, cooling of the laminate construction takes place. Cooling is achieved by cooling modules which are sited behind the upper and lower conveyor belts in this section of the machine. Refrigerated water from a chiller system is pumped through the cooling modules, which cools the laminated construction. The conveyors then expel the laminate construction from the opposite end of the machine from which they entered.

1.7—The process is monitored and controlled from a central computerized control panel to adjust heating, machine speed, and nip roll pressure.

1.8—Feeding, or staging, of materials prior to entering the laminator heat tunnel consists of a feeder conveyor belt with a rollstand suspended over the feeder conveyor to let-off film from a roll onto the substrate material the film is to be laminated to.

1.9—Machine settings for laminating the thermoplastic elastomer film to the rigid foam insulation panel facer material included:
Speed—3.2 meters/minute
Average Heat Element Temperature Setting—187° C.
Nip Roll Pressure Setting—22 Kg/cm$^2$ 1.10—After laminating the thermoplastic elastomer film to the rigid foam insulation panel facer, the composite construction was allowed to cool to ambient room temperature of approximately 27° C.

1.11—After cooling, the bond of the thermoplastic elastomer film to the foam insulation facer material was evaluated by hand, by attempting to peel the thermoplastic elastomer film away from the insulation facer. The result of the peel force by hand was that the bond between the thermoplastic elastomer film and the insulation facer was stronger than the bond of the insulation facer to the rigid polyisocyanurate foam insulation material, resulting in tearing the insulation facer away from the rigid foam insulation, and the thermoplastic elastomer bond to the insulation facer material remaining intact.

1.12—Subsequent lab peel testing was done from four (4) one (1) inch wide strips of the laminated composite construction on an Alpha Technologies T-10 Instron. The average force required to separate the insulation facer from the foam insulation, with the bond between the thermoplastic elastomer and insulation facer material remaining intact, was 5.091 lbs.

1.13—The second stage of creating the roofing composite involved infra-red (IR) heat-welding of a thermoplastic polyolefin (TPO) roof membrane ("thermoplastic outer layer") to the surface of the thermoplastic elastomer of the laminated composite construction, created in the first stage, of the thermoplastic elastomer bonded to the insulation facer of the rigid polyisocyanurate foam insulation panels.

1.14—A 1.14 mm thick×1.22 meter wide×15 meter long roll of Sure-weld TPO roof membrane manufactured by Carlisle Syntec Incorporated was obtained. The roof membrane was comprised of a reinforced 2 layer construction consisting of a white colored TPO top layer approximately 0.45 mm thick, a black colored TPO bottom layer approximately 0.69 mm thick, and an open weave polyester fabric between the 2 TPO layers, having the 2 TPO layers thermally bonded to each other at and through the open weave areas of the polyester fabric.

1.15—Infra-red heat-welding of the TPO roof membrane to the thermoplastic elastomer surface of the laminated composite construction associated with the rigid polyisocynurate foam insulation panels was accomplished at Fostoria Industries. Fostoria Industries is a manufacturer of industrial heating and lighting equipment.

1.16—To accomplish the process of IR heat-welding the TPO roof membrane to the thermoplastic elastomer surface of the insulation facer on the rigid polyisocynurate foam insulation composite construction Fostoria Industries designed and built an apparatus consisting of a 4-wheeled, approximately 1.4 meter wide×0.6 meter deep, carriage frame onto which were mounted; two (2) 5 cm wide×1.22 meter long IR panels, an IR temperature monitor, an elevated roller bar let-off for the TPO roof membrane, a transition roller bar, and a weighted trailer roller bar. For purposes of this example the apparatus is described as an Infrared Welding Machine (IRWM).

1.17—The IR panels on the IRWM apparatus were configured with one panel (panel A) mounted vertically facing the back of the apparatus and extending across the width of the apparatus, and the other panel (panel B) mounted horizontally facing downwards and extending across the width of the apparatus. Panel A functioned to apply heat to the backside of the TPO roof membrane, and Panel B functioned to heat the thermoplastic elastomer surface on the rigid foam insulation composite. Distance between IR Panel A and IR Panel B was approximately 5 cm. IR Panel B mounted on the IRWM so that it would pass approximately 2.5 cm above the surface it was intended to apply heat to.

1.18—The IR temperature monitor was mounted between IR Panel A and IR Panel B, pointing downward to monitor the surface temperature of the thermoplastic elastomer surface on the rigid foam insulation construction.

1.19—The IR Panels were fitted with power cords and the IR Temperature Monitor was fitted with a connector cable, for connection to a computer monitored control panel for purposes of controlling, monitoring, and recording IR Panel and substrate temperature levels and time intervals.

1.20—The transition roller bar was mounted at the inside lower rear of the IRWM apparatus frame, located approximately 1 cm lower than, and 4 cm back from IR Panel A, and extending across the width of the apparatus. The purpose of the transition roller bar was to pass the TPO roof membrane, as it was being unrolled or fed, as described in the following paragraph, from a vertical downward direction in front of IR Panel A, to a horizontal back direction as the IRWM machine moved forward in order to contact the thermoplastic elastomer surface on the rigid foam insulation composite construction it would be passing over.

1.21—A roll of TPO roof membrane was mounted on the IRWM elevated roller let-off with the black backside of the TPO roof membrane facing to the front of the IRWM apparatus. TPO roof membrane was fed downward to pass the black backside surface past IR Panel A's heating surface, under the transition roller bar of the IRWM apparatus to pass back away from the IRWM as the IRWM rolled forward, and under the weighted trailer roller bar.

1.22—The purpose of the weighted trailer roller bar was to apply pressure to the, now horizontal, TPO roof membrane causing the black TPO back side to contact the thermoplastic elastomer surface of the rigid roof insulation construction.

1.23—To create the roofing composite, a 1.2 m wide×2.4 m long panel of the rigid foam insulation composite with the thermoplastic elastomer film laminated to the surface of the insulation facer, as described in the first Stage above, was laid on a floor. The IRWM apparatus, with the mounted roll of TPO roof membrane, was positioned at one end of the insulation panel across the 4' width, aligned to travel the 8' length of the panel. IR Panel power cords, and the IR temperature monitor connection, were attached to the computer control panel.

1.24—The mounted TPO roof membrane was fed, as described above, to pass the black backside past IR Panel A, under the transition roller bar, and under the weighted trailer roller bar.

1.25—Via the computer control panel, power was supplied to the IR Panels. The IRWM apparatus remained motionless until the surface temperature of the thermoplastic elastomer on the rigid foam insulation construction reached 176° C., at which time the IRWM apparatus was rolled forward, with the TPO roof membrane being fed onto the heated thermoplastic elastomer surface of the composite insulation panel, maintaining a rate of 0.45 meters/minute to maintain the 176° C. surface temperature of the thermoplastic elastomer surface.

1.26—Upon reaching the end of the 8' panel length, power to the IR Panels was disengaged.

1.27—The roofing composite was allowed to cool to ambient room temperature of approximately 23° C.

1.28—After a cooling period of approximately 30 minutes, the bond of the black backside of the TPO roof membrane to the thermoplastic elastomer laminated to the rigid foam insulation was evaluated by hand. The purpose was to evaluate the robustness of the bond between the black TPO and the thermoplastic elastomer. This was accomplished by attempting to peel the TPO roof membrane away from the thermoplastic elastomer at a 90° angle to the flat surface of the insulation panel.

1.29—The result of the destructive/evaluative peel force by hand was that the IR heat-welding process of the two surfaces had created a homogenous type bond resulting in an inability to separate the two materials. Additionally, as seen in the first stage work, the applied peel force broke the bond between the insulation facer and the rigid foam, or failure occurred within the cellulose fiberglass insulation facer material. Thus, the bond between the black backside TPO roof membrane surface and the thermoplastic elastomer was stronger than the bond between the insulation facer, that the thermoplastic elastomer was bonding to, than the bond of the insulation facer to the polyisocyanurate foam insulation, and stronger than the composition of the insulation facer material.

Example 2

2.1—A rigid foam insulation panel, with a thermoplastic elastomer coated insulation facer was created by obtaining a roll of ACFOAMII insulation facer material from Atlas Roofing Corporation, and extrusion coating the insulation facer material by Rowmark, Inc. with Santoprene 8291-80TB thermoplastic elastomer. Subsequently, Atlas Roofing Corp. manufactured insulation panels with the thermoplastic elastomer coated insulation facer composite, per Atlas proprietary process for applying roof insulation facer to their polyisocyanurate foam insulation, to produce 5 cm thick×1.2 m wide×2.4 m long insulation panels.

2.2—A roofing composite, using the above described composite thermoplastic elastomer coated insulation facer foam insulation panel, was created at Trufast Corporation. Trufast is a manufacturer of fastening systems for commercial roofing, metal building construction, and specialty applications. The purpose of creating the roofing composite at Trufast Corporation was to evaluate the robustness of the associated bonds of the roofing composite using Trufast Corporation's "wind uplift" test apparatus which simulates wind uplift forces acting on commercial roof system constructions.

2.3—The first stage of creating the roofing composite involved fitting (installing) the composite thermoplastic elastomer coated insulation facer insulation panels within a 1.8 m wide×3 m long metal test frame. The insulation panels were cut to fit inside the test frame. The bottom of the test frame consisted of corrugated metal roof decking as used in commercial construction. The thermoplastic elastomer composition-coated insulation facer (the facer being a layer on the insulation panels) were attached to the corrugated metal roof decking by means of self-drilling Trufast #12 fastener screws for steel roof decks. The fasteners were fitted through round 7.6 cm diameter insulation fastening plates, through the 5 cm thick insulation panel, and fastened into the corrugated metal roof decking. The fastening pattern used, or frequency of fastening, the insulation was one fastener/fastening plate assembly per every 1.5 m$^2$ of surface area in a uniform pattern.

2.4—The second stage of creating the roofing composite involved infra-red (IR) heat-welding a thermoplastic polyolefin (TPO) roof membrane to the thermoplastic elastomer surface of the insulation panels installed on the "wind uplift" test apparatus, as described in 2.3 above.

2.5—The roof membrane used was 1.14 mm thick Sureweld TPO roof membrane as manufactured by Carlisle Syn-Tec Incorporated. The TPO roof membrane was cut to fit over the wind up-lift test frame and be installed as two overlapping sheets, with enough material to overhang the edges for later sealing purposes. The purpose of two sheets of roof membrane was to accommodate the width limitation of the infrared welding apparatus to be used. The seaming of the overlapped areas will be described later in this example.

2.6—To accomplish the process of IR heat-welding the TPO roof membrane to the thermoplastic elastomer surface of the rigid polyisocynurate foam insulation composite Fostoria Industries designed and built an apparatus consisting of a 4-wheeled, approximately 1.4 meter wide×0.6 meter deep, carriage frame onto which were mounted; two (2) 5 cm wide×1.22 meter long IR panels, an IR temperature monitor, an elevated roller bar let-off for the TPO roof membrane, a transition roller bar, and a weighted trailer roller bar. For purposes of this example the apparatus is described as an Infrared Welding Machine (IRWM).

2.7—The IR panels on the IRWM apparatus were configured with one panel (panel A) mounted vertically facing the back of the apparatus and extending across the width of the apparatus, and the other panel (panel B) mounted horizontally facing downwards and extending across the width of the apparatus. Panel A functioned to apply heat to the backside of the TPO roof membrane, and Panel B functioned to heat the thermoplastic elastomer surface of the rigid foam insulation construction. Distance between IR Panel A and IR Panel B was approximately 5 cm. IR Panel B mounted on the IRWM so that it would pass approximately 2.5 cm above the surface it was intended to apply heat to.

2.8—The IR temperature monitor was mounted between IR Panel A and IR Panel B, pointing downward to monitor the surface temperature of the thermoplastic elastomer surface on the rigid foam insulation construction.

2.9—The IR Panels were fitted with power cords and the IR Temperature Monitor was fitted with a connector cable, for connection to a computer monitored control panel for purposes of controlling, monitoring, and recording IR Panel and substrate temperature levels and time intervals.

2.10—The transition roller bar was mounted at the inside lower rear of the IRWM apparatus, located approximately 1 cm lower than, and 4 cm back from IR Panel A, and extending across the width of the apparatus. The purpose of the transition roller bar was to pass the TPO roof membrane, as it was being unrolled or fed, as described in the following paragraph, from a vertical downward direction in front of IR Panel A, to a horizontal back direction as the IRWM machine moved forward in order to contact the thermoplastic elastomer surface of the rigid foam insulation construction it would be passing over.

2.11—A roll of TPO roof membrane was mounted on the IRWM elevated roller let-off with the black backside of the TPO roof membrane facing to the front of the IRWM apparatus. TPO roof membrane was then fed downward to pass the black backside surface past IR Panel A's heating surface, under the transition roller bar of the IRWM apparatus to pass back away from the IRWM as the IRWM rolled forward, and under the weighted trailer roller bar.

2.12—The purpose of the weighted trailer roller bar was to apply pressure to the, now horizontal, TPO roof membrane causing the black TPO back side to contact the thermoplastic elastomer surface of the rigid roof insulation construction.

2.13—To create the roofing composite the IRWM apparatus, with a mounted roll of roof membrane, was positioned over the wind-uplift test apparatus frame to travel in the 3 m length of direction, with the right side wheels of the IRWM apparatus aligned on the metal frame of the wind-uplift test apparatus and the left side wheels of the IRWM resting on the previously installed roof insulation panel composite.

2.14—The first sheet of TPO roof membrane to be IR heat-welded in place was positioned, and of a width, such that it would only cover 1.02 m width (roughly ½) of the exposed surface of the installed roof insulation panels in the 3 m length direction of the wind-uplift test frame.

2.15—IR panel power cords, and the IR temperature monitor connection of the IRWM were attached to the computer control panel.

2.16—The mounted TPO roof membrane was fed, as described above, to pass the black backside past IR Panel A, under the transition roller bar, and under the weighted trailer roller bar.

2.17—Via the computer control panel, power was supplied to the IR Panels. The IRWM apparatus remained motionless until the surface temperature of the thermoplastic elastomer on the rigid foam insulation construction reached 176° C., at which time the IRWM apparatus was rolled forward, with the TPO roof membrane being fed onto the heated thermoplastic elastomer surface on the insulation panel, maintaining a rate of 0.45 meters/minute to maintain the 176° C. surface temperature of the thermoplastic elastomer surface.

2.18—Upon reaching the end of the 3 m wind-uplift test frame length, power to the IR Panels was disengaged.

2.19—The IRWM was repositioned at the original starting end on top of the wind-uplift test apparatus frame on the opposite side from the first sheet of installed TPO roof membrane, with the left side wheels of the IRWM resting on the wind-uplift test apparatus frame and the right side wheels resting on the installed first sheet of TPO roof membrane.

2.20—The second sheet of TPO roof membrane to be IR heat-welded in place was mounted on the IRWM, positioned, and of a width, such that it would cover the remaining width of the exposed surface of the installed composite insulation panels in the 3 m length direction of the wind-uplift test frame, and provide a 10 cm overlap of the installed first sheet of the TPO roof membrane for seaming purposes.

2.21—The process of steps 2.15-2.18 were repeated to complete the creation of the roofing composite.

2.22—The roofing composite was allowed to cool to ambient room temperature of approximately 23° C. While cooling was occurring, the overlapped roof membrane was seamed together using a handheld electric Leister Triac hot-air welding tool and a small rubber roller tool. The Leister Triac consists of a blower unit containing a heating element and a nozzle to direct air from the blower unit. The blower unit has controls to adjust the amount of air flow and heating element temperature. The nozzle can be fitted with shaped nozzle accessories to further direct heated air flow.

2.23—To seam the TPO roof membrane together the Leister Triac controls are adjusted to the desired heating element temperature and air flow appropriate for the seaming process. The nozzle of the hot-air welder is inserted between the overlapped roof membrane sheets, starting at one of the length of the area to be seamed. Hot-air welding of the overlapped seam area is a function of time, temperature, and pressure to achieve a melted bonding of the TPO roof membrane surfaces. The hot-air welder provides the necessary heat per the residence time determined by the user, and the rubber roller in the users other hand is used to roll and apply pressure to the top surface of the overlapped TPO roof membrane to press the two heated surfaces together.

2.24—A metal clamping frame was fitted over the wind-uplift test apparatus frame edges, such that the unbonded edges around the perimeter of the roof membrane component of the roofing composite extended between the metal frame of the wind-uplift test apparatus and the metal clamping frame. The purpose of the metal clamping frame was to achieve an airtight compression seal of the roof membrane to the wind-uplift test apparatus frame. The balance of the wind-uplift test apparatus is built as a sealed system.

2.25—An air compressor fitted with an air pressure gauge was attached to the wind-uplift test apparatus by means of a standard ⅜" ID air hose.

2.26—The wind-uplift test consists of pressurizing the space within the sealed wind-uplift test apparatus. In this example the roofing composite construction provides the sealed top of the wind-uplift test apparatus, and is the construction that is to be evaluated.

2.27—Pressure within the sealed wind-uplift test apparatus is increased gradually until failure occurs. Failure could be (a) fracture of the rigid foam of the insulation panel, (b) delamination of the TPO roof membrane from the thermoplastic elastomer, (c) delamination of the thermoplastic elastomer from the insulation facer material, (d) delamination of the insulation facer material from the rigid foam insulation, (e) pull-out of the Trufast screw fastener from the steel roof decking.

2.28—The effect of the air pressure within the wind-uplift test apparatus simulates the negative air pressure effect wind has on a roof membrane and roof assembly construction as described in this example, as wind passes across a surface. This constitutes the same principles associated with the lift or uplift (negative air pressure) forces that allow airplanes to fly by creating "lift" from air passing over the wings.

2.29—Air pressure within the wind-uplift test apparatus was gradually increased following the test procedures of Factory Mutual (FM) for determining wind-uplift ratings of roof systems. Over a 10 minute time period the air pressure within the wind-uplift test apparatus was increased to 135 psf, at which point failure occurred. At this point the air compressor was shut down.

2.30—The roof membrane was cut open at the observable area of failure for examination, and to determine the failure mode.

2.31—Observable failure was fracture of the rigid foam insulation in a conical circle around one of the insulation fastener plate assembly, with fracture taking place within the rigid foam body of the insulation panel.

2.32—Observations include; (a) the IR welded TPO roof membrane remained bonded to the Santoprene 8291-80TB thermoplastic elastomer, (b) the Santoprene 8291-80TB thermoplastic elastomer remained bonded to the cellulostic fiberglass reinforced insulation facer material, (c) the insulation facer material remained bonded to the rigid foam insulation, (d) the circular/conical fracture area of the rigid foam insulation around the insulation plate/fastener assembly was approximately 5 cm wider in radius at failure, than typically observed by the Trufast Corporation engineer experienced at performing this test.

2.33—Test results are: The 135 psf air pressure achieved was in the range of 25-30% above that typically achieved for the fastening pattern/rate used of one (1) fastener assembly per 1.5 $m^2$ of surface area for 5 cm thick polyisocyanurate rigid foam roof insulation. This is in comparison to the standard method of bonding the roof membrane to the insulation facer by means of solvent based contact adhesives typically used in commercial roofing for what is commonly described as a fully adhered single-ply roof system.

Example 3

3.1—Obtained a 1 meter wide roll of Texbond R 120, a 120 g/$m^2$ nonwoven matting from Freudenberg Texbond LP. Texbond R, per its MSDS, is made of recycled & virgin polyester, with a binder of vinyl-acrylic, styrene-acrylic, melamine and/or ureic resin. This material could be used as an insulation facer and/or component of a roofing composite.

3.2—A 1.5 m wide by 0.20 mm thick roll of thermoplastic elastomer film was extruded from pellets of Santoprene 8291-80TB, on a 76 mm extruder operated per typical processing parameters for thermoplastic vulcanizates (TPVs). The extruder was fitted with a 1.5 meter wide sheet die to produce the film. Prior to extrusion processing, the Santoprene 8291-80TB material was dried at 70° C. for 4 hours in a dehumidified dryer.

3.3—The first stage of creating the roofing composite involved creating a laminated composite by dry heat, to chemically and mechanically bond the Santoprene 8291-80TB thermoplastic elastomer to the Texbond R 120 nonwoven matting.

3.4—The heated lamination process was completed on a Reliant POWERBOND flat-bed laminator. The principle of flat-bed dry-heat laminating is a combination of heating, pressure and controlled speed at which materials are transported through the laminating machine. The machine is a heat tunnel consisting of an upper and lower conveyor belt, which sandwich and transport the layers of materials to be laminated together. The tunnel opening, or gap between the surfaces of the two conveyor belts, can be adjusted to accommodate varying thicknesses of materials to be laminated together. The process is automated, moving the upper and lower conveyors which transport the materials into the machine, where heat is then applied through a series of parallel, electrically heated elements located behind the conveyor belts. The materials are transferred through the heating section of the machine at an optimum speed for the specific materials to ensure the layers, via a melted or heat-activated medium, laminate together.

3.5—At the end of the heating section the materials pass through nip rollers which run across the full width of the machine. The nip rollers exert pressure to the materials, and melted or heat-activated medium, to expel trapped air and press the materials together to create the lamination bond.

3.6—After the nip roll section, cooling of the laminate construction takes place. Cooling is achieved by cooling modules which are sited behind the upper and lower conveyor belts in this section of the machine. Refrigerated water from a chiller system is pumped through the cooling modules, which cools the laminated construction. The conveyors then expel the laminate composite from the opposite end of the machine from which they entered.

3.7—The process is monitored and controlled from a central computerized control panel to adjust heating, machine speed, and Nip Roll pressure.

3.8—Feeding, or staging, of materials prior to entering the laminator heat tunnel consists of a feeder conveyor belt with a rollstand suspended over the feeder conveyor to let-off film from a roll onto the substrate material the film is to be laminated to.

3.9—Machine settings for laminating the Santoprene 8291-80TB thermoplastic elastomer film to the Texbond R 120 nonwoven matting included:
Speed—3.2 meters/minute
Average Heat Element Temperature Setting—187° C.
Nip Roll Pressure Setting—22 Kg/$cm^2$ 3.10—After laminating the Santoprene 8291-80TB thermoplastic elastomer film to the Texbond R 120 nonwoven matting, the composite was allowed to cool to ambient room temperature.

3.11—After cooling the bond of the Santoprene 8291-80TB thermoplastic elastomer film to the Texbond R 120 nonwoven matting was evaluated by hand, by attempting to peel the thermoplastic elastomer film away from the Texbond R 120. The result of the peel force by hand was that the bond between the thermoplastic elastomer film and the Texbond R 120 could not be broken without destroying both materials. The strength of the bond was stronger than the tensile strength of the structure of the materials.

3.12—The second stage of creating the roofing composite involved using a Leister Electron hot-air welding tool to bond 1.14 mm thick Sure-weld TPO roof membrane from Carlisle SynTec Incorporated to the laminated composite of Santoprene 8291-80TB & Texbond R 120 created in the first stage of Example 3.

3.13—The Leister Electron is a handheld hot-air welding tool consisting of a blower unit containing a heating element and a nozzle to direct air from the blower unit. The blower unit has controls to adjust the amount of air flow and heating element temperature. The nozzle can be fitted with shaped nozzle accessories to further direct heated air flow.

3.14—A 2 meter long×1 meter wide piece of the laminated Santoprene 8291-80TB thermoplastic elastomer Texbond R.120 composite, as created in the first stage of this example, was laid on the floor.

3.15—A 2 meter long×1 meter wide sheet of Sure-weld TPO roof membrane was aligned over the laminated composite as described in 3.14, with the black backside/bottom of the TPO roof membrane in contact with the Santoprene 8291-80TB surface of the composite described in 3.14. One-half of the roof membrane was folded back over itself in the 2 meter direction. Thus one-half of the composite of 3.14 was exposed, with the other half covered by the folded back TPO roof membrane.

3.16—The Leister Electron hot-air welder was turned on, with a heat setting of 7 and the air flow adjusted to maximum, and allowed to heat up.

3.17—Holding the Leister Electron hot-air welder, and pointing it at the area where the roof membrane was folded back and in contact with the surface of the Santoprene 8291-80TB surface on the composite of 3.14, the hot-air welder was moved back and forth along the area, much as a person sweeps back and forth with a leaf-blower, to sufficiently melt the surfaces of the 8291-80TB thermoplastic elastomer film on the Texbond R 120 and the black backside of the Sure-weld TPO roof membrane.

3.18—Simultaneously, as the surfaces of the Santoprene 8291-80TB laminated film and the black backside of the Sure-weld TPO roof membrane melted together, the folded back roof membrane was slowly rolled forward onto the thermoplastic elastomer TexBond R 120 composite keeping the heating and bonding process moving. At the same time, another individual applied pressure to the topside of the roof membrane that had been bonded in place by sweeping the surface with a broom to ensure full contact of the two heated surfaces.

3.19—The outer 5 cm edge area of the created roofing composite was left unbonded in order to allow for peel test evaluation of the bonds of the roofing composite.

3.20—The roofing composite of the Texbond R 120 laminated to the Santoprene 8291-80TB thermoplastic elastomer bonded to the TPO roof membrane by means of hot-air welding was allowed to cool to ambient room temperature of approximately 32° C.

3.21—After cooling, the un-welded edges of the Texbond R 120/Santoprene 8291-80TB composite and the TPO roof membrane were pulled by hand at a 180° degree angle from each other to evaluate the bond(s) of the roofing composite. The result of the peel evaluation was that the materials could not be separated without destroying the materials, i.e.; tearing.

One embodiment of the invention is directed to the use of a thermoplastic elastomer in a roofing composite, the roofing composite comprising a thermoplastic outer layer having a first surface and a second surface; a thermoplastic elastomer layer having a first surface and a second surface, wherein the first surface of the thermoplastic elastomer layer is bonded to the second surface of the thermoplastic outer layer; and an insulation layer having a first surface and a second surface, wherein the first surface of the insulation layer is bonded to the second surface of the thermoplastic elastomer layer.

Although the present invention and its advantages have been described in detail, it should be understood that various changes, substitutions, and alterations could be made without departing from the spirit and scope of the invention as defined by the following claims.

I claim:

1. A roofing composite comprising:
a thermoplastic outer layer having a first surface and a second surface, the outer layer comprising at least 50 wt %, by weight of the outer layer, of a thermoplastic polyolefin having a crystallinity of at least 25 percent as measured by differential scanning calorimetry, a melt temperature (Tm) from 120° C. to 175° C., and a melt flow rate (MFR) of less than 0.8 dg/min (230° C., 2.16 kg);

a thermoplastic elastomer layer having a first surface and a second surface, wherein the first surface of the thermoplastic elastomer layer is bonded to the second surface of the thermoplastic outer layer; and an insulation layer having a first surface and a second surface, wherein the first surface of the insulation layer is bonded to the second surface of the thermoplastic elastomer layer by extrusion, heating, radiation, mechanical bonding, or chemical bonding;

wherein the thermoplastic elastomer layer comprises the cured reaction product of from 20 to 60 wt % poly(ethylene-co-propylene-co-diene), from 20 to 60 wt % polypropylene, and from 20 to 40 wt % mineral or paraffinic oils.

2. The roofing composite of claim 1, wherein the thermoplastic elastomer layer comprises a thermoplastic elastomer composition having a melting point such that the second surface of the thermoplastic outer layer will bond to the first surface of the thermoplastic elastomer composition layer by the application, or creation, of heat and pressure.

3. The roofing composite of claim 2, wherein the thermoplastic elastomer composition comprises a functionalized thermoplastic continuous phase capable of chemically and mechanically bonding to the first surface of the insulation layer.

4. The roofing composite of claim 3, wherein the thermoplastic elastomer layer further comprises a styrene-isoprene-styrene block copolymer, a styrene-ethylene-butene triblock copolymer, a styrene-ethylene-propylene triblock copolymer, polyethylene copolymers with $C_3$-$C_8$ alpha-olefins, copolymers of propylene with $C_2$ or $C_4$-$C_8$ comonomers, and mixtures thereof.

5. The roofing composite of claim 2, wherein the melting point of the thermoplastic elastomer composition ranges from 170° C. to 230° C.

6. The roofing composite of claim 1, wherein the thermoplastic elastomeric layer comprising a thermoplastic elastomer composition is in the form of an extrusion coating on the second surface of the thermoplastic outer layer.

7. The roofing composite of claim 1, wherein thermoplastic elastomeric layer comprising a thermoplastic elastomer composition is an extrusion coating on the insulation layer.

8. The roofing composite of claim 1, wherein the thermoplastic elastomeric layer comprises a thermoplastic elastomer composition, wherein the thermoplastic elastomer composition is dispersed within the thermoplastic outer layer.

9. The roofing composite of claim 1, wherein the thermoplastic polyolefin in the thermoplastic outer layer is polypropylene.

10. A method of producing a roofing composite of claim 1 comprising:
positioning the thermoplastic elastomer layer having the first surface and the second surface between the thermoplastic outer layer having the first and the second surface and the insulation layer having the first surface and the second surface; and bonding the first surface of the thermoplastic elastomer layer to the second surface of the thermoplastic outer layer and the second surface of the thermoplastic elastomer layer to the first surface of the insulation layer.

11. The method of claim 10, wherein the first surface of the thermoplastic elastomer layer is bonded to the second surface of the thermoplastic outer layer under conditions of heat and pressure to bond the first surface of the thermoplastic elastomer layer to the second surface of the thermoplastic outer layer.

12. The method of claim 11, wherein the second surface of the thermoplastic elastomer layer is chemically or mechanically bonded to the first surface of the insulation layer.

13. The method of claim 12, wherein the roofing composite is one or more components of a roofing or siding system.

14. The method of claim 10, comprising:
   (a) heat fusing the thermoplastic polymeric outer layer to the thermoplastic elastomer layer; and
   (b) contacting the product of (a) with an insulation facing layer which is attached to the insulation layer such that the thermoplastic elastomer layer forms a heat-fused bond directly to the insulation facing layer, wherein the insulation layer is a rigid foam layer or a fiberglass layer.

* * * * *